United States Patent Office 2,965,677
Patented Dec. 20, 1960

2,965,677

POLYFLUOROTHIOLS AND METHOD OF PREPARING SAME

John F. Harris, Jr., Wilmington, Del., assignor to E. I. du Pont de Nemours and Company, Wilmington, Del., a corporation of Delaware No Drawing. Filed Mar. 4, 1959, Ser. No. 797,021

23 Claims. (Cl. 260—609)

This invention relates to a new process for preparing highly fluorinated mercaptans, and to certain new fluorinated mercaptans obtainable by this process.

In spite of the great advances made in recent years in the chemistry of organic fluoro compounds, highly fluorinated mercaptans are almost unkown. These compounds will be sometimes referred to here as polyfluorothiols, by which is meant mercaptans in which all, or all but one, of the hydrogen atoms in the hydrocarbon chain attached to the carbon atom bearing the mercapto group are replaced by fluorine atoms. No satisfactory and simple general method of preparing polyfluoroalkanethiols is known. Moreover, compounds of this class in which the mercapto group is secondary, i.e., compounds containing the >CHSH group, and polyfluoro gem.-olthiols, i.e., compounds containing the

group, have not been reported previously.

It is an object of this invention to provide a new process for preparing polyfluorothiols. A further object is to provide new polyfluorothiols. A still further object is to provide new gem.-olthiols and a novel process for their preparation. Another object is to provide new secondary mercaptans and a novel process for their preparation. Other objects will appear hereinafter.

These and other objects of this invention are accomplished by the following new process of preparing polyfluorothiols which comprises bringing into contact and reacting, at a temperature of at least —20° C., hydrogen sulfide with a polyfluorocarbonyl compound of the class of perfluoroalkanals, omega - hydroperfluoroalkanals, di(perfluoroalkyl) - ketones, di(omega - hydroperfluoroalkyl) ketones, and perfluorocycloalkanones. For brevity the perfluoroalkanals and omega-hydroperfluoroalkanals are referred to as polyfluoroalkanals. Likewise the di(perfluoroalkyl)ketones and di(omega-hydroperfluoroalkyl) ketones are referred to as di(polyfluoroalkyl)ketones.

The invention also provides, as new products, the following polyfluorothiols:

(1) the gem.-olthiols of the formula

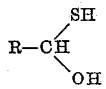

where R is perfluoroalkyl or omega-hydroperfluoroalkyl;

(2) the gem.-olthiols of the formula

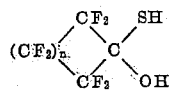

where $n$ is a cardinal number from 0 to 3, i.e., 0, 1, 2 or 3;

(3) the secondary mercaptans of the formula

where R is perfluoroalkyl or omega-hydroperfluoroalkyl; and (4) the secondary mercaptans of the formula

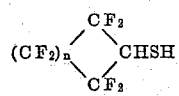

where $n$ is a cardinal number from 0 to 3, i.e., 0, 1, 2, or 3.

Depending upon the reaction conditions, and principally upon the operating temperature, the reaction of hydrogen sulfide with polyfluorocarbonyl compounds leads to two kinds of polyfluorothiols. In the lower temperature range, that is, at temperatures between about —20° C. and 100° C., the reaction is a simple addition of the hydrogen sulfide across the carbonyl double bond, and the reaction product is a gem.-olthiol, according to the illustrative equation

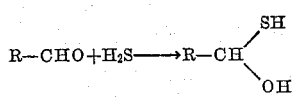

where R is a fluoroalkyl radical. It has unexpectedly been found that the gem.-olthiols produced from perfluorocycloalkanones and from fluoroaldehydes in which the fluoroalkyl radical attached to the carbonyl group has at most one hydrogen atom, are distillable and capable of being isolated in a pure state.

At higher temperatures, e.g., at temperatures of about 150° C. and above, a more complex reaction takes place, which can be viewed as a reductive thiolation, even though no elemental hydrogen is present in the system, i.e., hydrogen sulfide is the sole fluorine-free volatile reactant. The major reaction product is then the thiol corresponding to the polyfluorocarbonyl compound, in accordance with the illustrative equation $$R\text{---}CHO + 2H_2S \rightarrow R\text{---}CH_2SH + H_2O + S$$

where R is a fluoroalkyl radical. By-products include the corresponding sulfides and polysulfides. At intermediate temperatures. both the thiol and the gem.-olthiol are formed.

The process conditions involve simply maintaining the two reactants in contact at the reaction temperature until an appreciable amount of polyfluorothiol has been formed. The relative proportions of hydrogen sulfide and polyfluorocarbonyl compound are not critical. They are important only to the extent that it is desirable to utilize as much of the more expensive fluorocarbonyl compound as possible. For this reason, there is generally used at least one mole of hydrogen sulfide per carbonyl group, and normally the hydrogen sulfide is used in excess, which can be quite large, e.g., up to 10–20 moles or more of hydrogen sulfide per carbonyl group.

No reaction catalyst is necessary. However, the formation of gem.-olthiols, particularly at low temperatures, is facilitated by operating in the presence of hydrogen chloride. With such a catalyst, addition of hydrogen sulfide to the carbonyl group takes place at temperature as low as —20° C. or even lower. In the absence of catalyst, gem.-olthiols can also form at such low temperatures, but more slowly, and it is recommended to operate in the temperature range between about 15 and 100° C., and perferably 50–100° C. At higher temperatures, as already noted, the oxygen-free thiol will be the major product. There is no critical upper limit of temperature below the decomposition point of the reactants and reaction products, but it is in general unnecessary to use temperatures exceeding 300° C., the preferred range for the preparation of the oxygen-free polyfluorothiols being 150–250° C.

The reaction can be carried out at atmospheric pressure, for example by passing a stream of hydrogen sulfide through the polyfluorocarbonyl compound, the latter being, if desired, dissolved in an inert solvent such as hydrocarbon, halohydrocarbon, or ether. This method is particularly applicable when operating at low temperatures, e.g., up to about 15° C. At higher temperatures, the reaction is more efficiently conducted in sealed pressure vessels, either under the autogenous pressure developed by the reactants at the operating temperature or under an added pressure of hydrogen sulfide, which can be as high as the equipment will stand, e.g., up to 5000 atmospheres or more.

Appreciable amounts of polyfluorothiol are usually obtained in reaction periods as short as 30 minutes. Depending on the reactivity of the polyfluorocarbonyl compound and on the operating conditions, the reaction is in general essentially complete after from one to six hours of contact. The reaction products (gem.-olthiols, thiols, sulfides, polysulfides) are isolated and separated simply by fractional distillation at atmospheric or reduced pressure.

The following examples, in which parts are by weight, illustrate the invention in greater detail.

Example I

Thirty parts of trifluoroacetaldehyde hydrate was dehydrated by treatment at 90–100° C. with a mixture of sulfuric acid and phosphoric anhydride as described by Braid et al. in J. Am. Soc. 76, 4027 (1954), and the aldehyde thus formed was condensed in a flask containing methylene chloride cooled to —20° C. The flask was fitted with a reflux condenser cooled with a carbon dioxide/acetone mixture, and moderate streams of hydrogen sulfide and anhydrous hydrogen chloride were passed for three hours through the trifluoroacetaldehyde/methylene chloride mixture while maintaining the external cooling. The cooling bath was then removed and the reaction mixture was stirred at room temperature for an additional two hours. Distillation of the mixture yielded 18.3 parts (54% yield) of 2,2,2-trifluoro-1-hydroxyethanethiol,

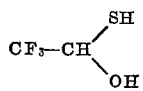

as a clear, colorless liquid boiling at 39–44° C. at 45 mm. pressure. Redistillation gave the pure product, B.P. 63° C. at 109 mm. pressure, $n_D^{25}$ 1.3849.

*Analysis.*—Calc'd for $C_2H_3F_3OS$: S, 24.2. Found: S, 23.2.

Strong infrared absorption at 2.95μ and and 3.85μ substantiated the presence of both the hydroxyl and mercapto groups.

Example II

The product of Example I was prepared without the help of a catalyst as follows:

A mixture of 18 parts of trifluoroacetaldehyde and 25 parts of hydrogen sulfide was loaded into a stainless steel cylinder and allowed to stand for 7 days at room temperature of about 20° C. The excess hydrogen sulfide was then bled off and the residue distilled under reduced pressure. There was obtained 14.6 parts (60% yield) of 2,2,2-trifluoro-1-hydroxyethanethiol, B.P. 51° C. at 80 mm. pressure.

*Analysis.*—Calc'd for $C_2H_3F_3OS$: F, 43.1; S, 24.2. Found: F, 43.8; S, 24.0.

Example III

A mixture of 31 parts of freshly distilled perfluoropropionaldehyde and 24 parts of hydrogen sulfide was loaded into a stainless steel cylinder and allowed to stand for about 16 hours at room temperature of about 20° C. After removal of the excess hydrogen sulfide, the residue was distilled. There was obtained 25.2 parts (66% yield) of 1-hydroxy-1-hydroperfluoropropanethiol-1,

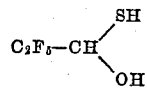

as a water-white liquid distilling at 56° C. at 66 mm. pressure, $n_D^{25}$ 1.3668.

*Analysis.*—Calc'd for $C_3H_3F_5OS$: F, 52.1; S, 17.6. Found: F, 52.7; S, 16.8.

Example IV

Using the procedure of Example III, a mixture of 16 parts of perfluorobutyraldehyde and 40 parts of hydrogen sulfide gave 13.1 parts (70% yield) of 1-hydroxy-1-hydroperfluorobutanethiol-1,

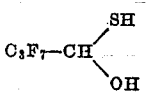

as a clear colorless liquid distilling at 53.5–54.5° C. at 46 mm. pressure, $n_D^{25}$ 1.3507.

*Analysis.*—Calc'd for $C_4H_3F_7OS$: F, 57.3; S, 13.8. Found: F, 57.5; S, 13.6.

Example V

Twenty-five parts of omega-hydroperfluorovaleraldehyde was placed in a stainless steel bomb and hydrogen sulfide was pressed into the bomb to a pressure of about 3000 atmospheres. The bomb was then heated to 70° C. After 20 minutes, the internal pressure was lowered to 1400 atmospheres, and this pressure was maintained at 70° C. for the remainder of the reaction period (10 hours). After filtering the crude reaction mixture there was obtained 18.8 parts of liquid product. Fractionation of a 6.86 part portion of this liquid gave 3.93 parts of 1-hydroxy-1,5-dihydroperfluoropentanethiol-1,

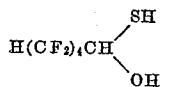

as a water-white liquid boiling at 70–72° C. at 16 mm., $n_D^{25}$ 1.3669, obtained in 37.5% yield.

*Analysis.*—Calc'd for $C_5H_4F_8OS$: S, 12.1. Found: S, 12.2.

Strong infrared absorption at 2.9μ and 3.85μ substantiated the presence of both hydroxyl and mercapto groups.

A derivative was prepared by adding 1.0 part of the gem.-olthiol in 10 parts of anhydrous diethyl ether to a solution of 0.95 part of 2,4-dinitrobenzenesulfenyl chloride in 30 parts of diethyl ether. After stirring the mixture for 15 minutes the solvent was evaporated. Upon recrystallization of the residue from a benzene-pentane mixture, a 1-hydroxyl-1,5-dihydroperfluoropentyl 2,4-dinitrophenyl disulfide,

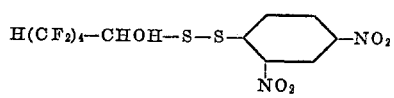

was obtained as pale yellow needles melting at 93–94.5° C.

*Analysis.*—Calc'd for $C_{11}H_6O_5N_2S_2F_8$: C, 28.6; H, 1.3; S, 13.9. Found: C, 28.4; H, 1.5; S, 14.0.

The infrared spectrum of this derivative confirmed the presence of the hydroxyl group and the absence of the mercapto group.

Example VI

The product of Example V was prepared without the use of additional hydrogen sulfide pressure as follows:

A mixture of 23.5 parts of omega-hydroperfluorovaleraldehyde and 30 parts of hydrogen sulfide was placed in a stainless steel cylinder and allowed to stand for about 16 hours at room temperature of about 25° C. After removing the excess hydrogen sulfide, the residue was distilled. There was obtained 19.5 parts (72% yield) of 1-hydroxy-1,5-dihydroperfluoropentanethiol-1 as a water-white liquid, B.P. 57–60° C. at 8 mm. pressure, $n_D^{25}$ 1.3663–1.3669.

Example VII

Twenty parts of perfluorocyclobutanone was placed in a stainless steel pressure bomb and hydrogen sulfide was pressed into the bomb to a pressure of about 2000 atmospheres. The bomb was heated at 50° C. for 5 hours. Upon distillation of the reaction mixture, there was obtained 11 parts of 1-hydroxyperfluorocyclobutanethiol-1,

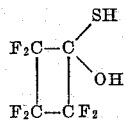

as a colorless liquid boiling at 48–50° C. at 58 mm., $n_D^{25}$ 1.3686.

*Analysis.*—Calc'd for $C_4H_2F_6OS$: F, 53.7; S, 15.1. Found: F, 53.4; S, 14.5.

Infrared spectroscopy showed the presence of both hydroxyl and mercapto groups.

Example VIII

Twenty-five parts of omega-hydroperfluorovaleraldehyde was placed in a stainless steel vessel into which hydrogen sulfide was pressed to a pressure of about 3000 atmospheres. The mixture was heated at 190° C. for a period of 6 hours. Distillation of the reaction product after separation from the sulfur by filtration gave 16.7 parts (62%) of 1,1,5-trihydroperfluoropentanethiol-1, $H(CF_2)_4CH_2SH$, as a clear, colorless liquid boiling at 129–130° C. at 760 mm., $n_D^{25}$ 1.3442.

*Analysis.*—Calc'd for $C_5H_4F_8S$: F, 61.3; S, 12.9. Found: F, 60.8; S, 13.0.

Strong infrared absorption at 3.85μ substantiated the presence of the mercapto group.

A derivative, 1,1,5-trihydroperfluoropentyl 2,4-dinitrophenyl disulfide,

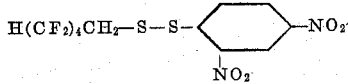

M.P. 55.5–56.5° C., was prepared from 2,4-dinitrobenzenesulfenyl chloride by the procedure described in Example V.

*Analysis.*—Calc'd for $C_{11}H_6O_4N_2S_2F_8$: C, 29.6; H, 1.4; S, 14.4. Found: C, 29.9; H, 1.3; S, 14.3.

The thiol was converted to the corresponding disulfide, bis(1,1,5-trihydroperfluoropentyl)disulfide, $$[H(CF_2)_4CH_2S]_2$$

by oxidation with chlorine in carbon tetrachloride at −15° to −20° C. The disulfide is a liquid boiling at 84° C./0.5 mm.–90° C./2 mm. $n_D^{25}$ 1.3688.

*Analysis.*—Calc'd for $C_{10}H_6F_{16}S_2$: C, 24.3; H, 1.2; S, 13.0. Found: C, 25.1; H, 1.6; S, 12.9.

Example IX

Into a 1-liter autoclave was placed a 0.48 mole (110 parts) of omega-hydroperfluorovaleraldehyde, and 2 moles of hydrogen sulfide was condensed in the autoclave. No additional pressure of hydrogen sulfide was applied, so that the reaction was carried out under the autogenous pressure of the reactants. The autoclave was heated for 10 hours at 200° C. Distillation of the reaction product after removal of the sulfur gave 57.8 parts of 1,1,5-trihydroperfluoropentanethiol-1, 15.9 parts of the bis(1,1,5-trihydroperfluoropentyl)disulfide described in Example VIII, and 20.8 parts of bis(1,1,5-trihydroperfluoropentyl)trisulfide, $[H(CF_2)_4CH_2S]_2S$. The latter is a liquid boiling at 144° C. at 2 mm., $n_D^{25}$ 1.3972.

*Analysis.*—Calc'd for $C_{10}H_6F_{16}S_3$: C, 22.8; H, 1.15; F, 57.8; S, 18.3. Found: C, 23.4; H, 1.38; F, 58.9; S, 17.9.

The thiol was converted to 1,1,5-trihydroperfluoropentanesulfonic acid, $H(CF_2)_4CH_2SO_3H$, by passing chlorine until in excess through a solution of 14 parts of the thiol in 100 parts of acetic acid containing 12 parts of water at room temperature. After removing the solvent by distillation, fractionation of the residue gave 9.5 parts of 1,1,5-trihydroperfluoropentanesulfonic acid as a liquid boiling at 138–139° C. at 1.0 mm., which solidified to a low melting, waxy, hygroscopic solid.

*Analysis.*—Calc'd for $C_5H_4F_8SO_3$: C, 20.3; H, 1.37; F, 51.3; S, 10.8. Found: C, 20.5; H, 1.57; F, 51.7; S, 11.0.

Infrared and nuclear magnetic resonance analysis confirmed the structure of this compound.

The barium salt was prepared by adding an aqueous solution of barium chloride to an aqueous solution of the sulfonic acid. The precipitated salt was dried over phosphoric anhydride at reduced pressure.

*Analysis.*—Calc'd for $C_5H_3F_8SO_3Ba_{1/2}$: C, 16.5; H, 0.83; F, 41.8; S, 8.8; Ba, 18.6. Found: C, 16.7; H, 0.94; F, 40.9; S, 8.8; Ba, 18.8.

Example X

Twenty-five parts of perfluorobutyraldehyde hydrate, $C_3F_7CH(OH)_2$, was placed in a bomb into which hydrogen sulfide was pressed to a pressure of 2000 atmospheres. The bomb was heated at 200° C. for 5 hours. Upon distillation of the reaction product after separation from the sulfur there was obtained 2.1 parts of 1,1-dihydroperfluorobutanethiol-1, $C_3F_7CH_2SH$, as a water-white liquid boiling at 75–77° C. at 760 mm. $n_D^{25}$ 1.3170.

*Analysis.*—Calc'd for $C_4H_3F_7S$: C, 22.2; H, 1.4; F, 61.5; S, 14.8. Found: C, 23.2; H, 1.5; F, 60.0; S, 14.5.

The same product is obtained under similar conditions by using free perfluorobutyraldehyde instead of the hydrate.

Example XI

Twenty-five parts of perfluoroheptanone-4 was placed in a bomb into which hydrogen sulfide was pressed to a pressure of about 3000 atmospheres. The bomb was heated at 200° C. for 5 hours. Distillation of the reaction product after filtering off the sulfur gave 13.3 parts (51% yield) of 4-hydroperfluoroheptanethiol-4,

as a clear colorless liquid boiling at 122–124° C. at 760 mm., $n_D^{25}$ 1.3082.

*Analysis.*—Calc'd for $C_7H_2F_{14}S$: C, 21.9; H, 0.5; F, 69.2; S, 8.3. Found: C, 22.3; H, 0.9; F, 68.8; S, 8.3.

A derivative, di(heptafluoropropyl)methyl 2,4-dinitrophenyl disulfide,

M.P. 99–100° C., was prepared from 2,4-dinitrobenzenesulfenyl chloride by the procedure described in Example V.

*Analysis.*—Calc'd for $C_{13}H_4N_2O_4F_{14}S_2$: C, 26.8; H, 0.7; S, 11.0. Found: C, 27.4; H, 1.0; S, 10.9.

Example XII

Ten parts of 1,7-dihydroperfluoroheptanone-3, $$H(CF_2)_2CO(CF_2)_4H$$

was placed in a stainless steel vessel into which hydrogen sulfide was pressed to a pressure of about 2000 atmospheres. The vessel was heated at 200° C. for 5 hours. After removal of the sulfur by filtration, the liquid reaction product was distilled. There was obtained 4.5 parts (43% yield) of 1,3,7-trihydroperfluoroheptanethiol-3 as a clear, colorless liquid boiling at 76–77° C. at 25 mm., $n_D^{25}$ 1.3428.

*Analysis.*—Calc'd for $C_7H_4F_{12}S$: S, 9.2. Found: S, 9.3.

Example XIII

Twenty parts of perfluorocyclobutanone was placed in a bomb into which hydrogen sulfide was pressed to a pressure of about 2000 atmospheres. The bomb was heated at 150° C. for 4 hours. Upon distillation of the reaction product after separation from the sulfur, there was obtained 11 parts of 1-hydroperfluorocyclobutanethiol-1,

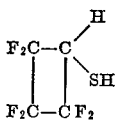

as a clear colorless liquid boiling at 62–63° C. at 760 mm., $n_D^{25}$ 1.3329.

*Analysis.*—Calc'd for $C_4H_2F_6S$: C, 24.5; H, 1.0; S, 16.8. Found: C, 25.3; H, 1.5; S, 16.4.

Strong infrared absorption at 3.85μ confirmed the presence of the mercapto group.

A derivative, 1-hydroperfluorocyclobutyl 2,4-dinitrophenyl sulfide,

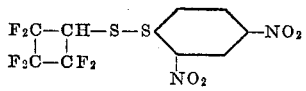

M.P. 84–85° C., was prepared from 2,4-dinitrobenzenesulfenyl chloride by the procedure described in Example V.

*Analysis.*—Calc'd for $C_{10}H_4N_2O_4F_6S_2$: C, 30.4; H, 1.0; S, 16.3. Found: C, 30.9; H, 1.2; S, 16.3.

While the invention has been illustrated in the foregoing examples with reference to certain specific polyfluorocarbonyl compounds, the process is broadly applicable to the preparation of polyfluorothiols by the reaction of hydrogen sulfide with any perfluoroalkanal, omega-hydroperfluoroalkanal, di(perfluoroalkyl)ketone, di(omega-hydroperfluoroalkyl)ketone or perfluorocycloalkanone. Thus, the above-described method can be applied to the reaction of hydrogen sulfide with, for example, perfluorobutyraldehyde, perfluoroisobutyraldehyde, perfluoroheptanal, perfluorodecanal, perfluorododecanal, perfluorononadecanal, difluoroacetaldehyde, 3-hydroperfluoropropionaldehyde, 9-hydroperfluorononanal, 11-hydroperfluoroundecanal, 17-hydroperfluoroheptadecanal, perfluoroacetone, perfluoro-3-pentanone, perfluoroisopropyl ketone, perfluoroisobutyl ketone, perfluoro-8-pentadecanone, perfluoro-19-heptatriacontanone, 1,3-dihydroperfluoroacetone, 1,5-dihydroperfluoro-3-pentanone, 1,17-dihydro-9-perfluoroheptadecanone, 1,37-dihydro-19-perfluoroheptatriacontanone, perfluorocyclopentanone, and the like. The most accessible, and therefore preferred, of these starting materials are those in which the perfluoroalkyl or omega-hydroperfluoroalkyl radicals attached to the carbonyl group have from 1 to 18 carbon atoms.

As already noted, certain of the polyfluorothiols obtainable by the above-described process are new, and they form part of this invention. They are:

(1) the gem.-olthiols

where R is perfluoroalkyl or omega-hydroperfluoroalkyl, the polyfluoroalkyl radical R preferably containing from 1 to 18 carbon atoms. Examples of these compounds include 1-hydroxy-1-hydroperfluorobutanethiol-1, 1-hydroxy-1-hydroperfluoroheptanethiol-1, 1-hydroxy-1-hydroperfluorodecanethiol-1, 1-hydroxy-1-hydroperfluorododecanethiol-1, 1-hydroxy-1-hydroperfluorononadecanethiol-1, 2,2-difluoro-1-hydroxyethanethiol-1, 1,3-dihydro-1-hydroxyperfluoropropanethiol-1, 1,9-dihydro-1-hydroxyperfluorononanethiol-1, 1,11-dihydro-1-hydroxyperfluoroundecanethiol-1, 1,17-dihydro-1-hydroxyperfluoroheptadecanethiol-1, and the like;

(2) the 1-hydroxyperfluorocycloalkanethiols of the formula

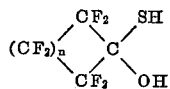

where n is a number from 0 to 3, including 1-hydroxyperfluorocyclopropanethiol-1, 1-hydroxyperfluorocyclopentanethiol-1 and 1-hydroxyperfluorocyclohexanethiol-1;

(3) the secondary mercaptans of the formula

where R is perfluoroalkyl or omega-hydroperfluoroalkyl, the polyfluoroalkyl radical R preferably containing from 1 to 18 carbon atoms. Examples of such secondary mercaptans include 2-hydroperfluoropropanethiol-2, 3-hydroperfluoropentanethiol-3, 3-hydroperfluoro(2,4-dimethylpentane)thiol-3, 4-hydroperfluoro(2,6-dimethylheptane)thiol-4, 8-hydroperfluoropentadecanethiol-8, 19-hydroperfluoroheptatriacontanethiol-19, 1,2,3-trihydroperfluoropropanethiol-2, 1,3,5-trihydroperfluoropentanethiol-3, 1,9,17-trihydroperfluoroheptadecanethiol-9, 1,19,37-trihydroperfluoroheptatriacontanethiol-19, and the like;

(4) the 1-hydroperfluorocycloalkanethiols of the formula

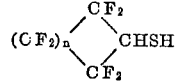

where n is a number from 0 to 3, including 1-hydroperfluorocyclopropanethiol-1, 1-hydroperfluorocyclopentanethiol-1 and 1-hydroperfluorocyclohexanethiol-1.

The polyfluorocarbonyl compounds used as starting materials in the process of this invention can be prepared by published methods, or by the methods briefly described below. Thus, the perfluoroalkanals (aldehydes of the general formula RCHO where R is $C_nF_{2n+1}$) can be prepared according to the process described in U.S. Patent 2,568,500. The omega-hydroperfluoroalkanals, that is, the aldehydes of the general formula RCHO where R is $H—C_nF_{2n}$ are obtainable, as described in U.S. Patent 2,842,601, by photochlorination of the corresponding alpha,alpha-omega-trihydroperfluoroalcohols,

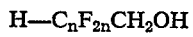

followed by thermal decomposition of the intermediate hemiacetals. The di(perfluoroalkyl)ketones, RRCO where R is $C_nF_{2n+1}$, and the di(omega-hydroperfluoroalkyl)ketones, RRCO where R is $H—C_nF_{2n}$, can be prepared by an extension of the Hauptschein et al. synthesis [J. Am. Chem. Soc. 77, 4930 (1955); also U.S. Patent 2,802,034] by reaction of an alkali metal with esters of the corresponding perfluoro- or omega-hydroperfluorocarboxylic acids. They can also be prepared by the reaction of an alkali metal alkoxide with two or more molar equivalents of an ester of the appropriate perfluoro- or omega-hydroperfluorocarboxylic acid, followed by acidification, as disclosed and claimed in Wiley patent application Ser. No. 730,266, filed April 23, 1958. The perfluorocycloalkanones, that is, the cyclic ketones of the formula

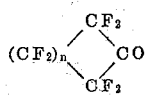

where $n$ is an integer, i.e., a cardinal number from 0 to 3, can be prepared by direct fluorination of the corresponding hydrocarbon cycloalkanones, or by other methods, as disclosed in U.S. Patent 2,712,555 for perfluorocyclopropanone. One of these perfluorocycloalkanones, perfluorocyclobutanone, is more conveniently prepared by acid hydrolysis of perfluorocyclobutyl methyl ether, itself prepared by cycloaddition of tetrafluoroethylene to methyl trifluorovinyl ether. The ketone is obtained as its hydrate, B.P. 59° C. at 50 mm. pressure, which is then dehydrated with phosphorus pentoxide to perfluorocyclobutanone, B.P. 0° C. at atmospheric pressure. In this connection, however, it should be noted that the hydrates of the polyfluorocarbonyl compounds can be used as equivalents of the free aldehydes or ketones in the process of this invention. Perfluorocyclobutanone and the above method for its preparation are disclosed and claimed in England Patent application Ser. No. 757,701 filed August 28, 1958 as a continuation-in-part of Ser. No. 717,805, filed Febraury 27, 1958, now abandoned.

The polyfluorothiols obtainable by the process of this invention possess the normal reactivity of the mercapto group and are thus adapted to any of the known uses for which thiols in general are suitable. They also possess the advantages imparted by the presence of a fluorocarbon chain, including increased stability towards physical and chemical agents and resistance to combustion.

Specifically, the gem.-olthiols have the property of releasing hydrogen sulfide in aqueous solution. Thus, they can be used for the precipitation of heavy metal ions as sulfides. For example, an alcohol solution of 1-hydroxyperfluorocyclobutanethiol-1 gives a precipitate of lead sulfide upon being added to an aqueous solution of lead nitrate, and of cadmium sulfide upon being added to an aqueous solution of cadmium chloride, and 1-hydroxy-1,5-di-hydroperfluoropentanethiol-1 reacts similarly. Thus, the gem.-olthiols of this invention are highly suitable for use as sulfide precipitants for the quantitative and qualitative separation of heavy metal ions, offering the advantages over hydrogen sulfide of being easily stored and used and free from noxious and corrosive properties.

The hydroxyl-free polyfluorothiols are useful per se as metal deactivators in gasoline, corrosion inhibitors in pickling and metal-cleaning baths, stablizers for fluoroolefins such as tetrafluoroethylene, viscosity-decreasing agents and chain-transfer agents in vinyl polymerization, etc. They are also useful as starting materials for a variety of useful highly fluorinated sulfur compounds such as sulfides, polysulfides, sulfoxides, sulfones and sulfonic acids. The polyfluorosulfonic acids, in particular, are useful as surface-active agents and dispersing agents, for example in the polymerization of fluoroolefins such as tetrafluoroethylene. The polyfluorothiols are also capable of addition to olefins to give stable sulfides suitable as heat-transfer agents.

The hydroxyl-free polyfluorothiols are further useful as solvents for highly fluorinated polymers. The solutions so obtained can be used to impregnate porous materials such as textiles, paper, wood, brick, etc. and to coat non-porous materials such as metals. For example, a solution of low melting tetrafluoroethylene polymer (M.P. 83–150° C.) in 4-hydroperfluoroheptanethiol-4 was prepared by heating 0.3 part of the polymer with 3 parts of the polyfluorothiol. Near the boiling point (120° C.) of the solvent, the solution was clear and homogeneous. A strip of filter paper was partly immersed for one minute in this solution maintained just below its boiling point. The strip was dried in air and then exposed to a stream of water. The area of the strip which had been immersed in the polymer solution shed water completely and did not become wet, whereas the untreated portion of the paper became wet and soggy, demonstrating the waterproofing effect obtained by impregnation with the polymer. Similarly, a small cylindrical white birch stick was partly immersed in the hot polymer solution for one minute. After evaporation of the solvent by air-drying, the part of the stick which had been impregnated by the polymer shed water completely and was not wet by it.

When the above-described polyfluorothiol solution of polytetrafluoroethylene cooled to room temperature, it formed an opaque, thick, paste-like gel. Reversible gels of this kind are useful for making tight, chemically inert seals on threaded joints, valves, couplings, fittings and similar metallic parts.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polyfluorothiol selected from the class consisting of gem.-olthiols having the formula

wherein R is selected from the class consisting of perfluoroalkyl and omega-hydrofluoroalkyl; gem.-olthiols having the formula

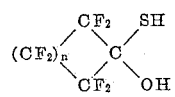

wherein $n$ is a cardinal number from 0 to 3 inclusive; secondary mercaptans having the formula

wherein R is selected from the class consisting of perfluoroalkyl and omega-hydroperfluoroalkyl; and secondary mercaptans having the formula

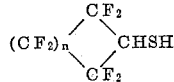

wherein $n$ is a cardinal number from 0 to 3 inclusive.

2. A gem.-olthiol having the formula

wherein R is perfluoroalkyl of from 1–18 carbon atoms.

3. A gem.-olthiol having the formula

wherein R is omega-hydroperfluoroalkyl of from 1–18 carbon atoms.

4. A gem.-olthiol having the formula

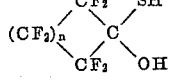

wherein $n$ is a cardinal number from 0 to 3 inclusive.

5. A secondary mercaptan having the formula

wherein R is perfluoroalkyl of from 1–18 carbon atoms.

6. A secondary mercaptan having the formula

wherein R is omega-hydroperfluoroalkyl of from 1–18 carbon atoms.

7. A secondary mercaptan having the formula

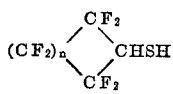

wherein $n$ is a cardinal number from 0 to 3 inclusive.

8. Process for preparing polyfluorothiol which comprises bringing into contact and reacting, at a temperature of at least −20° C., hydrogen sulfide with a polyfluorocarbonyl compound selected from the class consisting of perfluoroalkanals, omega-hydroperfluoroalkanals, di(perfluoroalkyl)ketones, di(omega-hydroperfluoroalkyl)ketones and perfluorocycloalkanones having from 3–6 ring carbon atoms, and obtaining as a resulting product a polyfluorothiol.

9. Process for preparing a polyfluorothiol which comprises bringing into contact and reacting, at a temperature within the range of −20° C. to 150° C., hydrogen sulfide and a polyfluoroalkanal having the formula R—CHO wherein R is perfluoroalkyl, and obtaining as a resulting product a gem.-olthiol having the formula

wherein R is defined as aforesaid.

10. Process for preparing a polyfluorothiol as set forth in claim 9 wherein said hydrogen sulfide is reacted with said polyfluoroalkanal in contact with hydrogen chloride.

11. Process for preparing a polyfluorothiol which comprises bringing into contact and reacting, at a temperature within the range of −20° to 150° C., hydrogen sulfide and a polyfluoroalkanal having the formula R—CHO wherein R is omega-hydroperfluoroalkyl, and obtaining as a resulting product a gem.-olthiol having the formula

wherein R is defined as aforesaid.

12. Process for preparing a polyfluorothiol as set forth in claim 11 wherein said hydrogen sulfide is reacted with said polyfluoroalkanal in contact with hydrogen chloride.

13. Process for preparing a polyfluorothiol which comprises bringing into contact and reacting, at a temperature within the range of 150° to 300° C., hydrogen sulfide and a di(polyfluoroalkyl)ketone having the formula

wherein R is a perfluoroalkyl, and obtaining as a resulting product a secondary mercaptan having the formula

wherein R is defined as aforesaid.

14. Process for preparing a polyfluorothiol which comprises bringing into contact and reacting, at a temperature within the range of 150° to 300° C., hydrogen sulfide and a di(polyfluoroalkyl)ketone having the formula

wherein R is omega-hydroperfluoroalkyl, and obtaining as a resulting product a secondary mercaptan having the formula

wherein R is defined as aforesaid.

15. Process for preparing a polyfluorothiol which comprises bringing into contact and reacting, at a temperature within the range of −20° to 150° C., hydrogen sulfide and a perfluorocycloalkanone having the formula

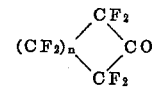

wherein $n$ is a cardinal number of 0 to 3 inclusive, and obtaining as a resulting product a gem.-olthiol having the formula

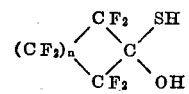

wherein $n$ is defined as aforesaid.

16. Process for preparing a polyfluorothiol which comprises bringing into contact and reacting, at a temperature within the range of 150° to 300° C., hydrogen sulfide and a perfluorocycloalkanone having the formula

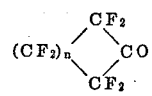

wherein $n$ is a caridnal number from 0 to 3 inclusive, and obtaining as a resulting product a secondary mercaptan having the formula

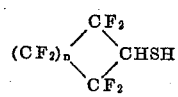

wherein $n$ is defined as aforesaid.

17. 2,2,2-trifluoro-1-hydroxyethanethiol.
18. 1-hydroxyperfluorocyclobutanethiol-1.
19. 4-hydroperfluoroheptanethiol-4.
20. 1-hydroperfluorocyclobutanethiol-1.
21. 1-hydroxy-1-hydroperfluoropropanethiol-1.
22. 1-hydroxy-1-hydroperfluorobutanethiol-1.
23. 1-hydroxy-1,5-dihydroperfluoropentanethiol-1.

No references cited.

UNITED STATES PATENT OFFICE
CERTIFICATION OF CORRECTION

Patent No. 2,965,677                                December 20, 1960

John F. Harris, Jr.

It is hereby certified that error appears in the above numbered patent requiring correction and that the said Letters Patent should read as corrected below.

Column 2, line 47, for "temperatures." read -- temperatures, --; column 3, line 36, after "Am." insert -- Chem. --; column 4, line 63, after "mixture," strike out "a"; column 5, line 70, after "placed" strike out -- a --; column 6, line 9, for "1.38" read -- 1.39 --; column 10, line 33, for "-hydrofluoroalkyl" read -- -hydroperfluoroalkyl --; column 11, line 20, after "preparing" insert -- a --; column 12, line 1, strike out "a", first occurrence; line 49, for "caridnal" read -- cardinal --.

Signed and sealed this 13th day of June 1961.

(SEAL)
Attest:

ERNEST W. SWIDER                               DAVID L. LADD
Attesting Officer                                    Commissioner of Patents